United States Patent Office 3,159,129
Patented Dec. 1, 1964

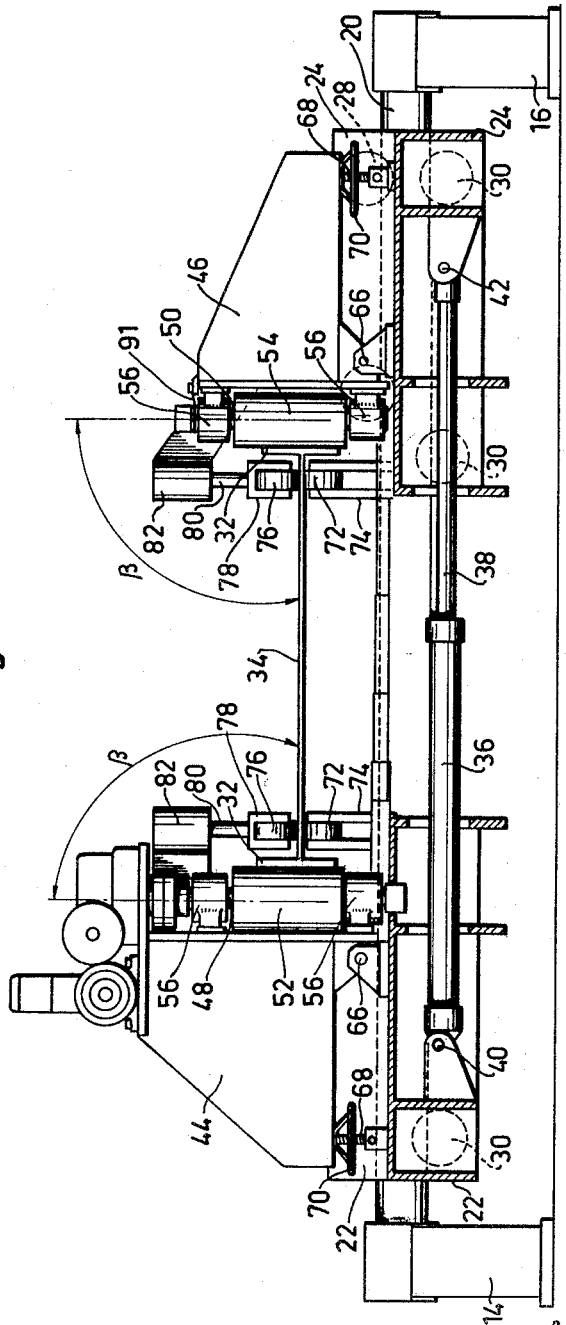

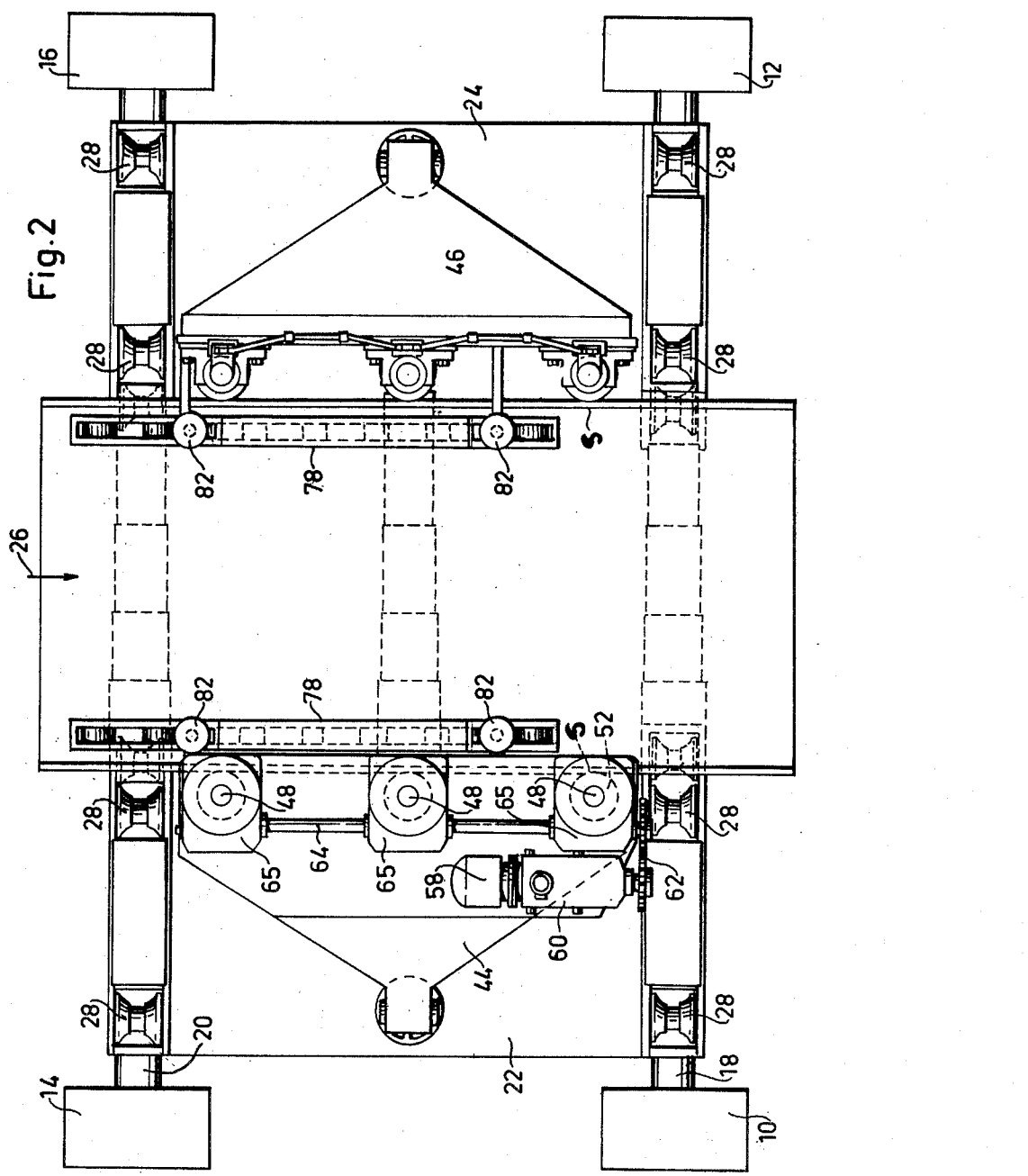

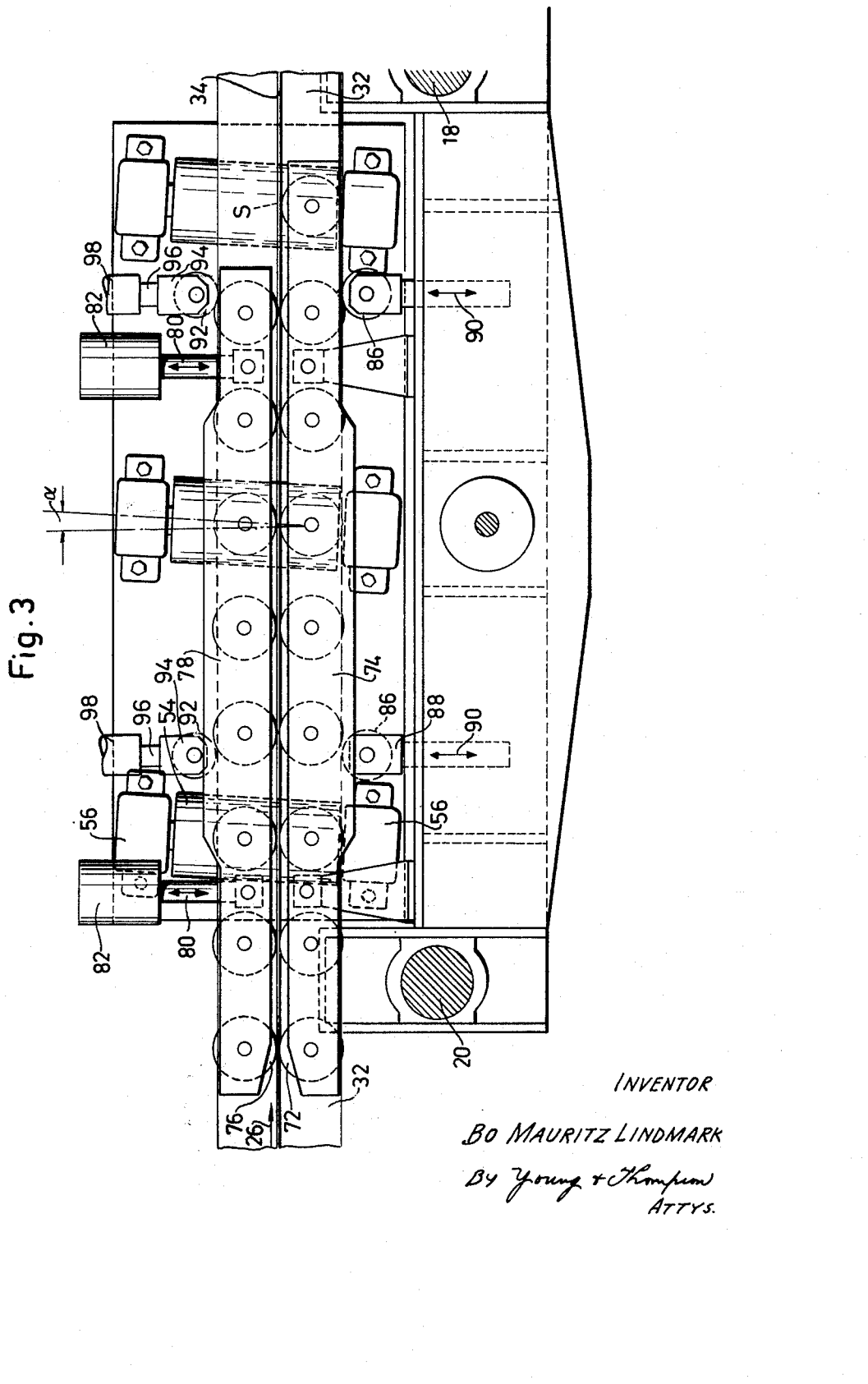

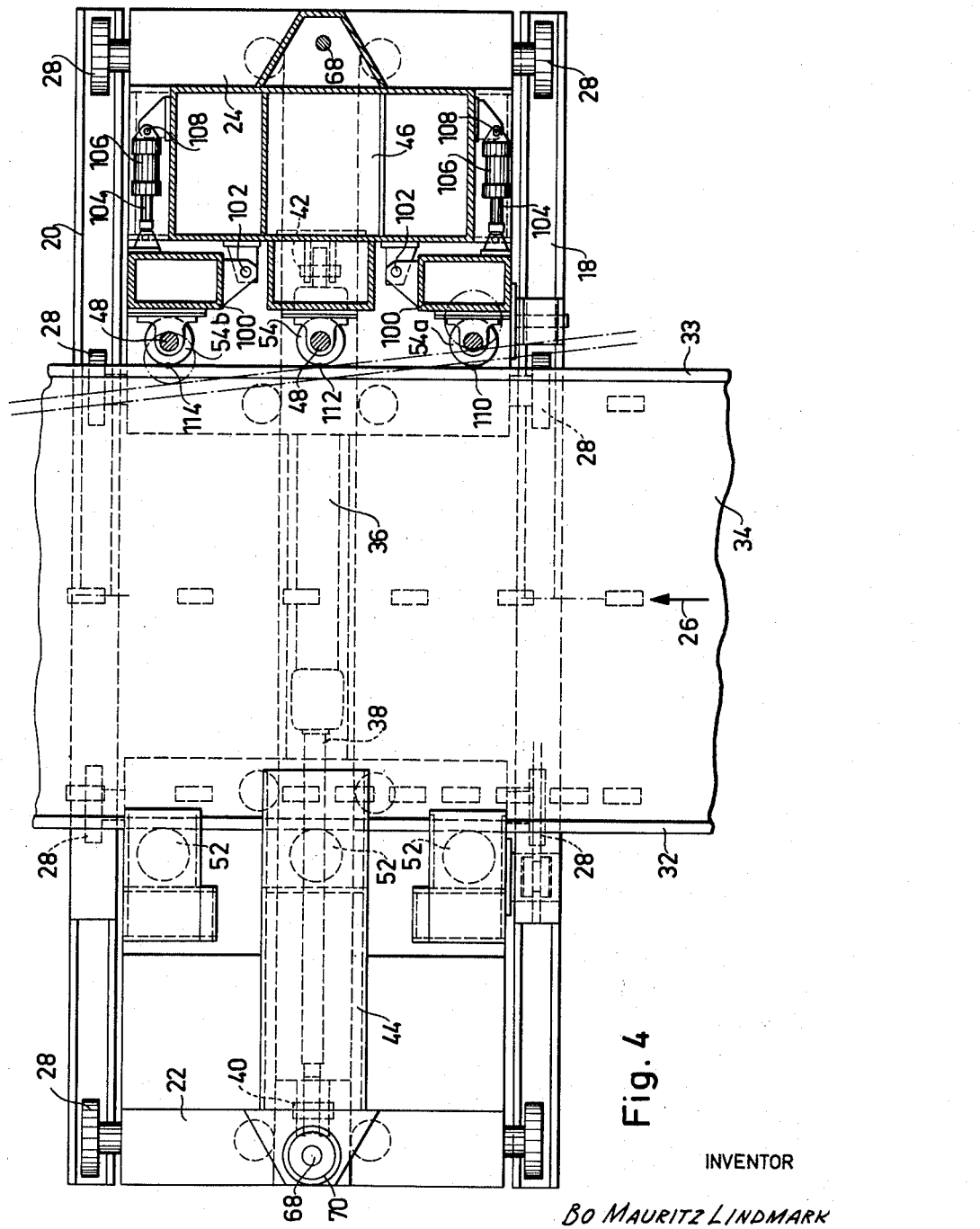

3,159,129
BEAM-WELDING MACHINE
Bo Mauritz Lindmark, Trollbacken, Sweden, assignor to A.B. Broderna Hedlund, Stockholm, Sweden, a corporation of Sweden
Filed Feb. 19, 1963, Ser. No. 259,523
Claims priority, application Sweden, Feb. 27, 1962, 2,170/62; Dec. 13, 1962, 13,462/62
11 Claims. (Cl. 113—131)

The present invention relates to a machine for welding beam components to one another to form a beam. Machines of the type indicated are capable of manufacturing beams of various types such as I-beams, U-beams, L-beams, box-like beams and all types of beams where the beam components comprise at least one flange and a web.

The main object of the invention is to provide means in the machine rendering it capable of setting the flange at a suitable angle to the web prior to the welding operation so that the flange and the web after welding have the correct, usually right angle with one another. In other words, the invention has for its main object to provide a beam-welding machine capable of compensating for the deformation of the material of the beam components during and after the welding operation proper which takes place substantially as a consequence of the heating of certain limited portions of the material.

A further object of the invention is to provide a machine permitting the manufacture of beams by feeding one or more flanges together with a web plate continuously through the machine past a welding place without the need of spot-welding or otherwise securing the components to one another before feeding them through the machine.

A still further object of the invention is to provide means in a beam-welding machine for supporting the individual components of the beam in correct mutual position during their feed to the welding place.

The invention has also for its object to provide a machine for welding a flange to a web of a beam which has parallel longitudinal edges as well as a beam in which the longitudinal edges form an angle with one another or in which one or both of said edges are curved.

Further objects of the invention and advantages obtained thereby will appear from the following description of two embodiments illustrated in the annexed drawing. FIG. 1 is a vertical cross-sectional view of the first embodiment of the machine, FIG. 2 is a top view of the machine, FIG. 3 an enlarged longitudinal view, and FIG. 4 a top view of a second embodiment.

While the machine according to the embodiments illustrated is designed for welding the flanges to the web of I-beams, the invention is not limited thereto and the machine may be modified for welding beams of other types, such as T-beams, L-beams, box-shaped beams and the like. Referring to FIGS. 1 and 2, the machine comprises horizontal guides 18 and 20 which are secured to uprights 10, 12 and 14, 16 respectively, and support opposite carriages 22, 24 which are movable on the guides toward and away from each other at right angles to the direction 26 of feed or path of the beam components to be welded together. The carriages are provided not only with wheels 28 rolling on the upper sides of the preferably round guide bars, but also with wheels 30 in engagement with the lower sides of the guide bars. All of the wheels have flanges on either side of the guide bars so that the carriages are effectively guided vertically as well as laterally. The carriages are interconnected by a device which enables the carriages to be moved toward and away from each other along the guide bars and is adapted to force the flanges 32 against the web 34 of the beam which is about to be or is being welded. As shown in FIG. 1, this device consists of a hydraulic cylinder 36 and a piston 38 movable in the cylinder. The outer end of the cylinder and the outer end of the piston are articulated to the carriages 22 and 24, respectively, by means of pivots 40 and 42 respectively. The carriages 22, 24 carry frames 44, 46 in which shafts 48, 50 with keyed laterally backing rollers 52, 54 for the flanges 32 of the beam are mounted in bearings 56 located above and below the respective laterally backing rollers. The shaft 48 of the backing rollers 52 is a drive shaft which via a continuously variable speed gear 60 and a chain transmission 62 is connected to a motor 58 (FIG. 2). In the embodiment illustrated, three laterally backing rollers are provided on either side of the beam. The rollers 52 on the shafts 48 are coupled to each other and synchronously driven by a common longitudinally extending shaft 64 and by a worm gear 65 for each shaft 48. The shafts 50 on the carriage 24 idle in the bearings 56. The frames 44, 46 are pivotally mounted on shafts 66 which are mounted in the carriages 22 and 24 and extend parallel to the direction of feed of the beam components. The frame on each carriage is adjustable about the shaft 66 by means of a screw 68 and a nut and hand wheel 70 provided between the outer edge of each carriage at the outer part of the frame 44 and 46, respectively. This device renders possible adjustment of the angle β between the axes of rotation of the backing rollers 52 and the plane of the web plate 34.

For supporting the web plate 34 in accurate position during its forward movement there are provided sets of supporting rollers 72 near each edge portion of the web plate. The rollers 72 are mounted on stationary lower bars 74, and a series of pressure rollers 76 are mounted in upper bars 78 which are connected with hydraulically or pneumatically actuated pistons 80 of cylinders 82 such that the upper bars by means of the rollers 76 can force the web plate 34 down against the supporting rollers 72. The bars 74, 78 and the rollers 72, 76 extend from a place at the inlet end of the machine as far as to the weld area S, FIG. 2, so that the web plate is effectively supported in vertical direction as far as to the proximity of the weld area.

As will be seen from FIG. 3, the advancing flange 32 rests on a pair of supporting rollers 86 mounted in holders 88 which as indicated by the double arrow 90 are vertically adjustable. FIG. 3 also shows that the axes of rotation of the laterally backing rollers 54 are not located at right angles to the plane of the web plate 34, that is, to the direction of the feed of the web plate, but are slightly inclined at an agle α. As a result thereof the laterally backing rollers bias the flange 32 downward against the supporting rollers 86 during the forward movement of the beam components.

In order to maintain the flanges 32 in correct positions during the advancing movement thereof, they may also be acted upon from above by means of rollers 92 mounted in holders 94 which are forced down by pistons 96 of hydraulic cylinders 98.

The laterally backing rollers 52, 54 are insulated from the carriages. Current is passed to the roller 54 located nearest the weld area S from a contact device 91, such that welding current can be supplied to the beam through the laterally backing rollers.

The mode of operation of the machine described is substantially as follows.

Beam blanks in the form of two flanges and a web plate are assumed to be in positions for being fed into the machine with the flanges standing edgewise on either side of the horizontal web plate. By means of the cylinder 36 and the piston 38 the carriages 22, 24 are moved from each other through a distance such that flanges and the web can be fed in between the laterally backing rollers 52, 54 and that the ends of the flanges and the web can arrive at the weld areas S, the upper bars 78 and rollers 76 assuming their upper end positions. The carriages 22 and 24 are now moved toward each other at a moderate pressure and such as to adapt themselves to the location of the web plate in case that the web plate has been fed offset from the centre of the machine. The upper bars 78 of the rollers 76 are forced downward in the direction toward the lower bars 74 to keep the web 34 in accurate position between the rollers 76 and 72.

The carriages 22, 24 are then forced toward each other at full working pressure whereupon the welding operation can be started. The welding speed can be controlled by means of the gear 60.

Due to the fact that the axes of the laterally backing rollers 54 are inclined at an angle α with respect to the vertical the flanges 32 will be forcibly urged down against the supporting rollers 72 while the beam components are longitudinally advanced by the rotating rollers 52. As a result, the flanges will be accurately positioned both vertically and relative to the web plate 34 not only while the beam components are advancing toward the weld area but even during the welding operation at that area.

If the flanges were fed in parallel relation into the welding machine and made right angles with the web plate they would not remain parallel to each other nor make right angles with the web after the welding operation when the material has cooled down. Due to the fact that the laterally backing rollers by means of the frames 44, 46 are adjustable about the pivots 66 such that the angle β between the axes of the rollers and the plane of the web plate can be varied it is possible to obtain welded beams with parallel flanges and right angles between the flanges and the web. The angle β has to be adjusted prior to the welding operation depending on the thickness of the flanges and web and the nature of the weld.

In addition to the possibility of continuously welding flanges to the webs of beams so as to obtain right angles between the flange and web the machine described offers a plurality of advantages the most important of which are simple and convenient control and high accuracy in operation. Due to the hydraulic operation of the carriages which carry the laterally backing rollers for the flanges and due to the guiding of the carriages by means of wheels running on guide members the lateral pressure acting between the backing rollers and the flanges can be adjusted with high accuracy which is of special importance in case of beams with thin webs. The machine can be conveniently adjusted for different beam dimensions, and the time required for such adjustment is very short. The web plate and flanges are readily adjustable in correct mutual positions to place the flanges exactly relative to the web.

Further advantages are obtained by the embodiment illustrated in FIG. 4. The wheels 28 of the carriages 22, 24 run on rails 18, 20. Similarly to the above described embodiment the frames 44, 46 may be pivotable about horizontal shafts and may be raised and lowered at their outer ends by means of screws 68 provided with hand wheels 70 resulting in angular adjustment of the shafts 48 on which the backing rollers 52, 54 for the flanges 32, 33 are mounted. By this angular setting the plane of the flanges is adjusted relative to the plane of the web plate. In the machine illustrated in FIGS. 1–3 the shafts of the backing rollers 52, 54 on either side of the path of movement of the beam components are located in alignment and parallel to the parallel flanges of the beam. These positions of the shafts 48 and the position of a beam having parallel flanges are indicated by full lines in FIG. 4. However, in order to adapt the machine for welding flanges to the web which are not parallel, but make a certain angle with each other, as shown by the right-hand flange illustrated by chain-dotted lines in FIG. 4, the two outer backing rollers 54a, 54b located on one side of the path of movement of the beam components are displaceable toward and away from said path of movement so as to be adjusted for instance in the positions indicated by chain-dotted lines. To this end, the rollers 54a, 54b are carried by holders 100 in the form of box-shaped beams which are mounted on vertical pivots 102 and connected to pistons 104 of hydraulic or pneumatic cylinders 106 articulated to the frame 46 on the carriage 24. The pivots of the cylinders 106 are denoted at 108. By means of the pistons 104 and cylinders 106 the backing rollers 54a and 54b may be placed in arbitrary positions between two end positions such that the points of contact 110, 112, 114 with the flange 33 are lying on a line which is parallel to the flange 32 or makes an angle therewith or on a line arbitrarily curved within suitable limits.

The beam components are advanced through the machine in the direction indicated by the arrow 26. In case of beams with varying height of web, the mean distance between the backing rollers 52 on one side of the path and the backing rollers 54 on the other side of the path has to be adapted to the height of the web according as the beam components are advancing. This alteration is effected by means of the piston 38 and cylinder 36 which are inserted between the carriages 22 and 24 and connected thereto by means of the pivots 40, 42.

In machines of the kind illustrated having three backing rollers the intermediate roller 54 need of course not be adjustable relative to the carrying frame 46, it being sufficient for the outer backing rollers 54a and 54b to be adjustable in the manner described. In certain cases two backing rollers on either side of the path of movement may be sufficient in which case only one of the rollers has to be adjustable relative to the carrying frame. In the embodiment illustrated the backing rollers 52 are not adjustable relative to each other toward and away from the path of movement, but it is conceivable to make one or more of these rollers adjustable similar to the backing rollers 54a and 54b on the opposite side.

During the advancing movement the flange 33 is adapted to rest on rollers mounted on horizontal shafts which are projecting from the box-shaped holders 100.

Similar rollers may be provided for engaging the top edge of the flange, for instance as shown in FIG. 3. These rollers keep the flange in engagement with the lower rollers such that the flange assumes its correct position in vertical direction and is appropriately guided with respect to the web plate 34.

What is claimed is:

1. A machine for welding beam components such as a flange to a web plate in the manufacture of beams comprising supports for the web plate, supports for the flange, backing means for maintaining the flange at a suitable angle with respect to the web plate in contact with a longitudinal edge thereof and for feeding the flange and the web longitudinally through the machine and means to adjust said backing means for varying said angle prior to the welding operation to obtain the desired angle, usually a right angle, between the flange and the web plate after the welding operation.

2. A machine as claimed in claim 1, and further characterized in that said backing means consist of a series of rollers engaging the side of the flange remote from the web plate, drive shafts being provided for said rollers, each drive shaft and its roller make an angle smaller than a right one with the direction of feed of the flange so as to tend to force the flange toward its supports.

3. A machine as claimed in claim 1 and further comprising a carriage for the backing means and guide members for said carriage extending transversely of the direction of feed of the beam components in the machine.

4. A machine as claimed in claim 1, and further characterized in that the supports carrying the web plate consist of sets of lower rollers and bars carrying said rollers, one set of rollers supporting the web plate in close proximity to each of the longitudinal edges thereof, similar bars and rollers being provided above and preferably right opposite the lower ones and resting on the upper side of the web plate such that the web plate during its forward movement between the upper and lower rollers is advanced in desired position to the weld area.

5. A machine as claimed in claim 4 and further characterized in that the upper bars are adjustable by means of pistons toward and away from the lower bars.

6. A machine as claimed in claim 1 and further characterized in that the supports for the flange comprise vertically adjustable rollers.

7. A machine for welding beam components such as a flange to a web plate at the longitudinal edge of the latter, comprising guides extending transversely of a path of feed of the beam components during welding, opposite carriages displaceable on said guides, a frame pivoted to each carriage about an axis substantially parallel with said path of feed, backing rollers carried by each frame for engagement with the beam components, means to displace said carriages on the guides toward one another for pressing said backing rollers against the beam components to keep them in mutual contact during the welding operation, and means to adjust the frames about the pivots to set the flange at an angle to the web prior to the welding operation to obtain the desired angle, differing from said preset angle, after welding.

8. A machine for welding beam components such as a flange to a longitudinal edge of a web plate for the manufacture of a beam, comprising supports for carrying the beam components during feed thereof longitudinally through the machine, backing members on either side of the beam components for pressing the flange in contact with the longitudinal edge of the web plate during the feed, at least one of said backing members at one side of the beam components being adjustable relatively to an adjacent one of said members on the same side towards and away from the backing members at the other side, and means to displace all backing members as a unit on one side towards and away from the backing members at the other side.

9. A machine for welding beam components such as a flange to the longitudinal edge of a web plate for manufacturing a beam, comprising guides extending transversely of a path of feed for the beam components during welding, carriages displaceable on said guides, a frame pivoted to each carriage about an axis substantially parallel with the path of feed, holders mounted pivotally on one frame for adjustment toward and away from the path of feed, backing rollers to press the beam components in contact with one another during welding, one backing roller being journalled in each holder, and means to adjust the frame about its pivot to set the backing rollers and the flange engaged by said backing rollers at an angle to the web prior to the welding operation to obtain a desired angle, differing from the preset angle, after welding.

10. A machine as claimed in claim 9 and further characterized by the fact that three backing rollers are provided on either side of the path of movement of the beam components and that the two outer of said rollers located on one side of said path are mounted on pivoted holders.

11. A machine for welding beam components such as a flange to the longitudinal edge of a web plate for manufacturing a beam, comprising guides extending transversely of a path of feed for the beam components during welding, carriages displaceable on said guides, a frame pivoted to each carriage about an axis substantially parallel with the path of feed, holders mounted on one frame, at least one holder being adjustable to enable setting thereof toward and away from the path of feed in relation to another of said holders, backing rollers to press the beam components in contact with one another during welding, one backing roller being journalled in each holder, and means to adjust the frame about its pivot to set the backing rollers and the flange engaged by said backing rollers at an angle to the web prior to the welding operation to obtain a desired angle, differing from the preset angle, after welding.

References Cited in the file of this patent
UNITED STATES PATENTS

| | | |
|---|---|---|
| 2,179,802 | Sykes | Nov. 14, 1939 |
| 2,179,803 | Sykes | Nov. 14, 1939 |